US008237724B1

(12) United States Patent
Booth, Jr.

(10) Patent No.: US 8,237,724 B1
(45) **Date of Patent: *Aug. 7, 2012**

(54) LOADING AN INTERNAL FRAME BUFFER FROM AN EXTERNAL FRAME BUFFER

(75) Inventor: Lawrence Booth, Jr., Phoenix, AZ (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/236,544

(22) Filed: Sep. 19, 2011

Related U.S. Application Data

(63) Continuation of application No. 12/827,557, filed on Jun. 30, 2010, now Pat. No. 8,022,959, which is a continuation of application No. 12/351,372, filed on Jan. 9, 2009, now Pat. No. 7,755,633, which is a continuation of application No. 10/821,485, filed on Apr. 9, 2004, now Pat. No. 7,492,369.

(51) Int. Cl.
*G09G 5/399* (2006.01)
*G06F 13/14* (2006.01)
*G06F 13/00* (2006.01)

(52) U.S. Cl. ......................... 345/539; 345/519; 345/537

(58) Field of Classification Search .................. 345/519, 345/530, 536, 537, 539, 545, 556, 531, 534
See application file for complete search history.

(56) References Cited

U.S. PATENT DOCUMENTS

| | | | | |
|---|---|---|---|---|
| 5,150,312 A | | 9/1992 | Beitel et al. | |
| 5,519,825 A | | 5/1996 | Naughton et al. | |
| 5,774,134 A | * | 6/1998 | Saito | 345/537 |
| 5,825,921 A | | 10/1998 | Dulong | |
| 5,847,705 A | * | 12/1998 | Pope | 715/790 |
| 5,860,016 A | * | 1/1999 | Nookala et al. | 713/324 |
| 6,108,015 A | | 8/2000 | Cross | |
| 6,118,486 A | | 9/2000 | Reitmeier | |
| 6,393,520 B2 | * | 5/2002 | Yoshikawa et al. | 711/119 |
| 6,909,434 B2 | * | 6/2005 | Takala et al. | 345/537 |
| 7,492,369 B2 | | 2/2009 | Booth | |
| 2003/0227460 A1 | | 12/2003 | Schinnerer | |
| 2004/0150647 A1 | | 8/2004 | Aleksic et al. | |

* cited by examiner

*Primary Examiner* — Joni Hsu

(57) ABSTRACT

A method for storing a first frame into a system, wherein the system includes i) a first chip, ii) a display controller, and iii) a copy device, and wherein the first chip includes a first memory. The method includes: reading, using the display controller, a first frame from a second memory, wherein the second memory is external to the first chip; and while the first frame is being read from the second memory by the display controller, using the copy device to copy the first frame from the second memory to the first memory. Subsequent to the copy device copying the first frame from the second memory to the first memory, the first frame is stored in both the first memory and the second memory.

9 Claims, 3 Drawing Sheets

LOADING AN INTERNAL FRAME BUFFER FROM AN EXTERNAL FRAME BUFFER

CROSS-REFERENCE TO RELATED APPLICATIONS

This present disclosure is a continuation of U.S. application Ser. No. 12/827,557, filed on Jun. 30, 2010 which is a continuation of U.S. application Ser. No. 12/351,372 (now U.S. Pat. No. 7,755,633), filed on Jan. 9, 2009, which is a continuation of U.S. application Ser. No. 10/821,485 (now U.S. Pat. No. 7,492,369), filed on Apr. 9, 2004.

BACKGROUND

1. Field

Embodiments of the invention relate to the field of display systems, and more specifically, to an apparatus and method for retrieving display data from an internal frame buffer and an external frame buffer.

2. Background

Portable devices may employ an internal frame buffer that is embedded within a graphics chip to store display data. However, due to cost of providing a large internal memory array within the graphics chip, the internal memory array is typically not large enough to contain more than one buffer, which may be needed for implementing double buffered graphics or multimedia performance model techniques. In double buffering, two frame buffers are provided instead of a single frame buffer. In this regard, the display system can write pixel data into one frame buffer while the display shows pixel data previously written into the other frame buffer. In some prior art systems, one frame buffer (i.e., internal frame buffer) will be located internally within the graphics chip, while the other frame buffer (i.e., external frame buffer) is located outside the graphics chip. In some prior art system, the display controller implementing double buffering may alternate between refreshing the display from the internal frame buffer and the external frame buffer.

BRIEF DESCRIPTION OF THE DRAWINGS

The embodiments of the invention are illustrated by way of example and not by way of limitation in the figures of the accompanying drawings in which like references indicate similar elements. It should be noted that the references to "an" or "one" embodiment of this disclosure are not necessarily to the same embodiment, and such references mean at least one.

DETAILED DESCRIPTION

Figure 1:
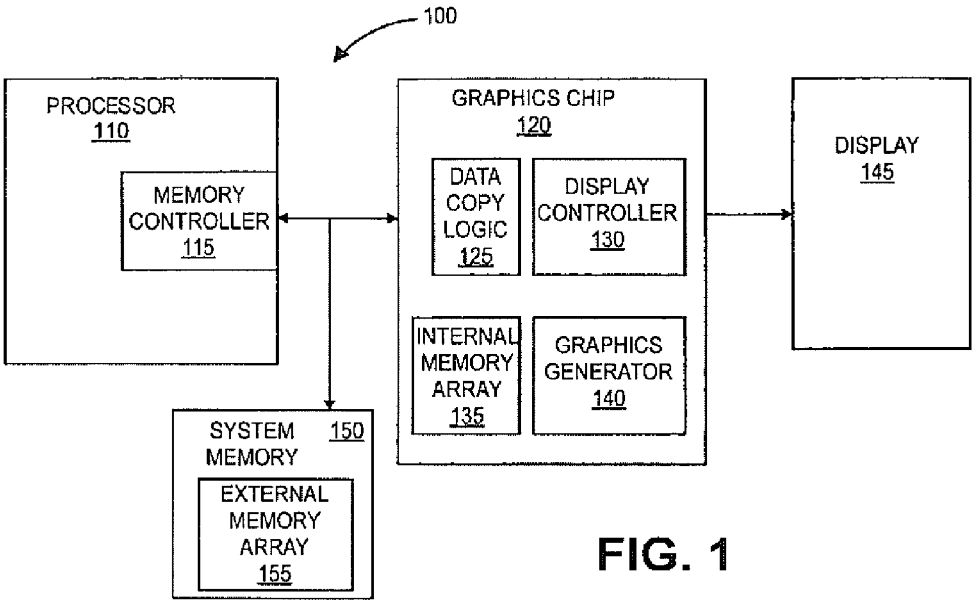
FIG. 1 shows a block diagram of one example of a portable device, in which the embodiments of the invention may be implemented.

FIG. 1 shows one example of a portable device 100, in which the embodiments of the invention may be implemented. The portable device 100 shown in FIG. 1 includes a processor 110 and a discrete graphics chip 120. In the illustrated embodiment, the graphics chip 120 communicates with the processor 110 via a memory controller 115 contained within the processor 110. The graphics chip 120 is used to control a visual display of still and/or video images on a display device 145 (e.g., liquid crystal display (LCD), and flat panel display (FPD)). The processor 110 is also coupled to a system memory 150 via the memory controller 115.

The graphics chip 120 includes a graphics generator 140, a display controller 130 and an internal memory array 135. The internal memory array 135 is used as an internal frame buffer for buffering display data internally within the graphics chip 120. The display data may be generated from the graphics generator 140, processor 110, or other components within the portable device 100. The portable device 100 also includes an external frame buffer (external memory array) 155 that is coupled to receive display data generated by the graphics generator 140, the processor 110 or other components within the portable device. In one embodiment, the system memory 150 has a portion allocated as the external frame buffer 155 for buffering the display data external to the graphics chip 120. The display controller 130 may retrieve display data from either the internal frame buffer 135 or the external frame buffer 155 and activates the display device based on the display data.

In one context, the terms "internal memory array" and "internal frame buffer" are used interchangeably to describe a memory space for buffering display data, which resides in the same chip that contains the display controller. Similarly, the terms "external memory array" and "external frame buffer" are used interchangeably to describe a memory space for buffering display data, which resides in a chip separate from the display controller.

In one embodiment, the portable device 100 implements a technique known as double buffering. The display data generated by the graphics generator 140 is written into the external frame buffer while the display device 145 shows pixel data previously written into the internal frame buffer. Once the most recent display data has been written into the external frame buffer 155, the display controller 130 will perform a new frame display refresh operation by retrieving the display data from the external frame buffer 155. As the display data is being read by the display controller, during the new frame display refresh operation, the graphics chip will copy the same display data from the external frame buffer 155 to the internal frame buffer 135. In one embodiment, the copy operation executes simultaneously with the display controller 130 retrieving the display data from the external frame buffer. Once the process of copying the display data into the internal frame buffer has been completed, the display controller 130 will execute subsequent display refresh operations by retrieving the display data from the internal frame buffer 135 until a new frame is available in the external frame buffer.

In one embodiment, the display controller 130 or a frame buffer controller within the graphics chip is used to coordinate which buffer will be read by the display controller at any given moment. Specifically, there may be a signal generated within the graphics chip that indicates when it needs to stop displaying the contents of one frame buffer and to start displaying the contents of the other frame buffer. In one embodiment, the display controller will read display data from the external frame buffer when it receives an indication that the external frame buffer 155 contains the most recent display data. Then, during subsequent display refresh operations, the display controller will retrieve display data from the internal frame buffer until there is an indication that the external frame buffer contains the most recent display data. In another embodiment, the display controller may be configured to switch between the external frame buffer and the internal frame buffer in a certain defined pattern. For example, the display controller may be programmed to retrieve data from the external frame buffer once and then switch to the internal frame buffer during a defined number of refresh operations (e.g., 2, 3 to 1000s of times), and repeat this process. The number of times the display controller reads from the internal frame buffer during each cycle may be determined based on the display refresh rate and the information update rate. Typically, the display refresh rate is much higher than the information update rate (from 2 or 3× to 1000's of times more frequent).

The copy operation to copy the display data from the external frame buffer 155 to the internal frame buffer 135 is accomplished by a data copy logic 125 included within the graphics chip 120. The display data copied into the internal frame buffer is the same display data read by the display controller from the external frame buffer during the new frame display refresh operation. In one embodiment, the copy operation is performed simultaneously with the display controller 120 reading the display data from the external frame buffer 155. In one embodiment, the data copy logic 125, the display controller 130 and the internal frame buffer 135 are disposed on a single graphics chip 120. And, the external frame buffer 155 is disposed on another chip (e.g., system memory 150) separate from the graphics chip 120.

Figure 2:
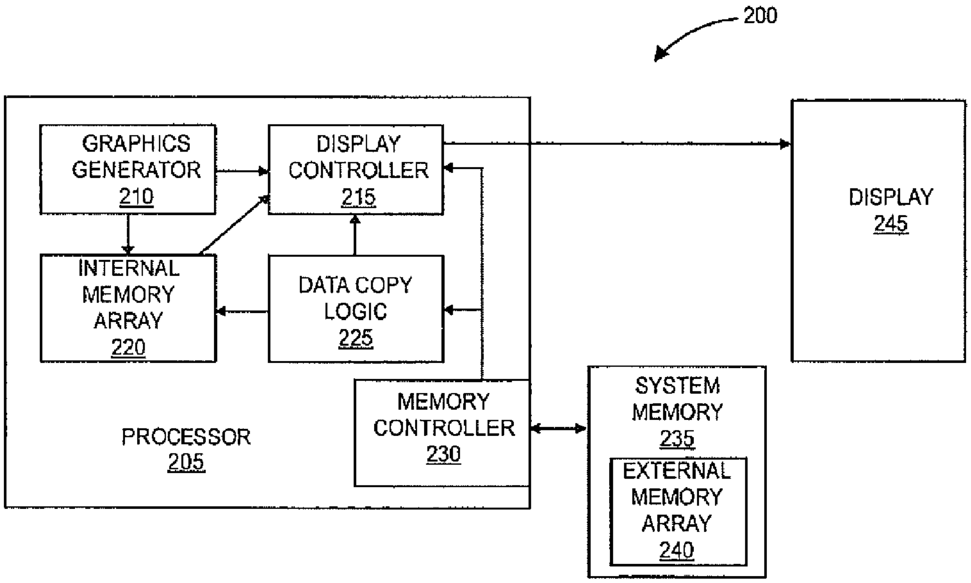
FIG. 2 shows a block diagram of another example of a portable device, in which the embodiments of the invention may be implemented.

FIG. 2 shows another example of a portable device 200, in which the embodiments of the invention may be implemented. The portable device 200 shown in FIG. 2 includes a processor 205 with an integrated graphics system, which is used to control a visual display of graphics and/or video images on a display device 245. The processor 205 is coupled to a system memory 235 via a memory controller 230.

The processor 205 shown in FIG. 2 includes a graphics generator 210, a display controller 215 and an internal memory array 220. The internal memory array 220 is used as an internal frame buffer for buffering display data internally within the processor 205. The display data may be generated from the graphics generator 210 or other components within the processor 205. In one embodiment, the system memory 235 has a portion allocated as an external frame buffer (external memory array) 240 for buffering display data external to the processor 205.

The processor 205 shown in FIG. 2 further includes a data copy logic 225 to copy display data from the external frame buffer 240 to the internal frame buffer 220 simultaneously with the display controller reading the display data from the external frame buffer 240. In the illustrated embodiment, the data copy logic 225, the display controller 215 and the internal frame buffer 220 are incorporated within the processor. And, the external frame buffer 240 is disposed on another chip (e.g., system memory) separate from the processor 205.

Embodiments of the invention may be implemented within a portable device, such as cellular phones, personal digital assistant (PDA), web tables, handheld gaming consoles, as shown in FIGS. 1 and 2. However, it will be readily apparent that one of ordinary skill in the art that the embodiments of the invention are applicable to any suitable device that is battery powered and includes a display screen and are not limited to the portable devices illustrated in FIGS. 1 and 2.

Figure 3:
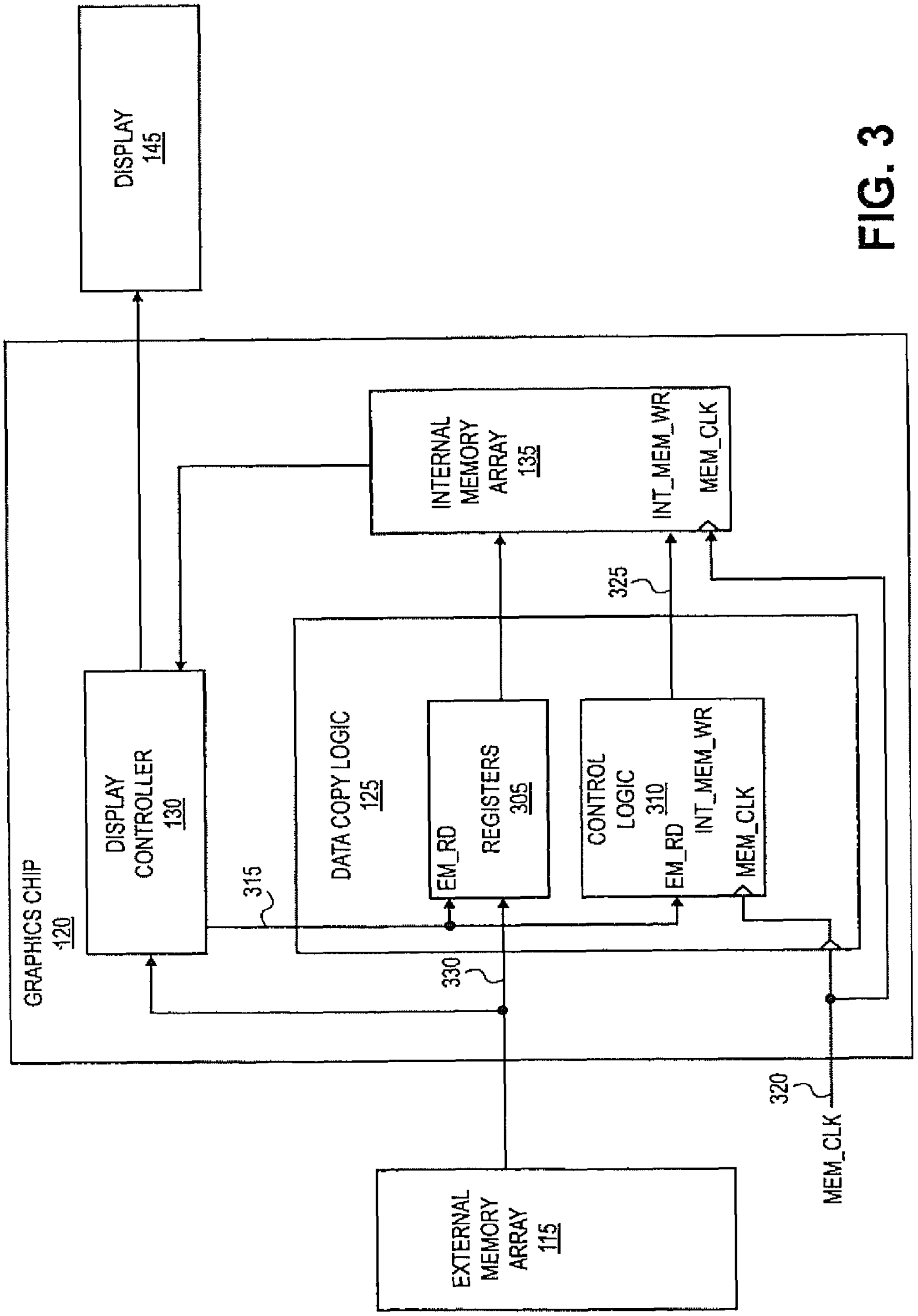
FIG. 3 shows a block diagram of data copy logic integrated within a graphics chip according to one embodiment.

FIG. 3 shows a graphics chip 120 according to one embodiment. The graphics chip 120 is adapted for use with a portable device that has one frame buffer (i.e., internal frame buffer) 135 disposed in the graphics chip 120 and another frame buffer (i.e., external frame buffer) 115 disposed on another chip separate from the graphics chip. As indicated above, the external frame buffer 115 may be implemented by allocating a portion of the system memory to buffer display data generated by the graphics generator.

The graphics chip 120 is configured to load display data from the external frame buffer 115 into the internal frame buffer 135 ("on the fly") while it is being loaded into a display controller 130. The graphics includes a bus 330 which feeds the display data from the external frame buffer 115 to the internal frame buffer 135 as it is being read by the display controller 130 to be formatted for the display device 145.

In one embodiment, the data copy logic 125 is used to copy the display data into the internal frame buffer 135 during the new frame display refresh operation. In one context, the term "new frame display refresh operation" is used to describe a time period when the most recent display data resides in the external frame buffer 115 and the display controller 130 is reading the most recent display data from the external memory. By copying the display data into the internal buffer frame 135 during the new frame display refresh operation, this allows subsequent display refresh operations to be loaded from the low power internal frame buffer rather than the high power external memory frame buffer. Accordingly, the display controller 130 may only need to read from the external frame buffer once until the next display data update. All subsequent reads refreshing the display from the data set will be executed from the internal frame buffer 135 until there is new frame available in the external frame buffer, resulting in power savings as well as reducing the bandwidth demands on the external bus. As noted above, the display refresh rate is often much higher than the information update rate (from 2 or 3× to 1000's of times more frequent).

It will be appreciated that the embodiments of the graphics chip and the system memory will consume less power than prior art systems employing a display controller that alternates between the reading display data from the internal frame buffer and the external frame buffer. More specifically, such prior art systems may require the display controller to access the external frame buffer as much as half of the time. Because the external frame buffer is typically provided by allocating a portion of the system memory, the display controller must steal bus bandwidth from the host processor each time it needs to access the external frame buffer. Additionally, such prior art display systems may consume a large amount of power since greater power is required by the graphics chip to retrieve the display data from the external frame buffer than if the display data is retrieved from the internal frame buffer.

In operation, the data copy logic receives incoming data from the external frame buffer 115 and buffers a portion of the incoming data and then transfers the portion of the incoming data to the internal frame buffer 135 at a rate determined based on a certain internal control signal. In one embodiment, the data copy logic 125 includes one or more registers 305 capable of holding one or more data transactions of display data as they comes through the bus from the external frame buffer. For example, the register 305 may be sized to hold 32 bits of information.

In one embodiment, the data copy logic 125 accepts the display data at the rate it is being read out of the external memory and generates a write control signal 325 for the internal memory array. More specifically, the data copy logic 125 includes a control logic 310 that generates a write control signal (int_mem_wr) 325 based on the timing consideration of the internal memory array 135 and the timing considerations of the registers 305. The display controller 130 generates external memory read signal (em_rd) 315, which is sent to the registers 305 and the control logic 310 residing within the data copy logic 125. The external memory read signal (em_rd) 315 is used by the data copy logic 125 to accept the incoming data from the external frame buffer 115. The control logic 310 is coupled to receive a memory clock signal (mem_clk) 320. Based on the external memory read signal (em rd) 315 and the memory clock signal (mem_clk) 320, the control logic 310 will generate an internal memory write signal (int_mem_wr) 325, which is used by the internal frame buffer 135 to receive and store the display data from the registers contained in the data copy logic.

In accordance with one aspect of one embodiment, a battery-powered portable device employing the graphics chip is able to reduce power consumption by reducing the number of times the display controller needs to access the display data from the external frame buffer. By copying data into the internal frame buffer simultaneously with the reading the display data out of the external frame buffer, this feature enables a reduction in the power consumed by both the system memory and the graphics chip.

While the data copy logic is described as implemented within a graphics chip, it should be noted that the embodiments of the invention are applicable to any integrated circuit (IC) chip that includes a display controller and an internal memory array, including a processor with integrated graphics system, such as the processor shown in FIG. 2.

Figure 4:
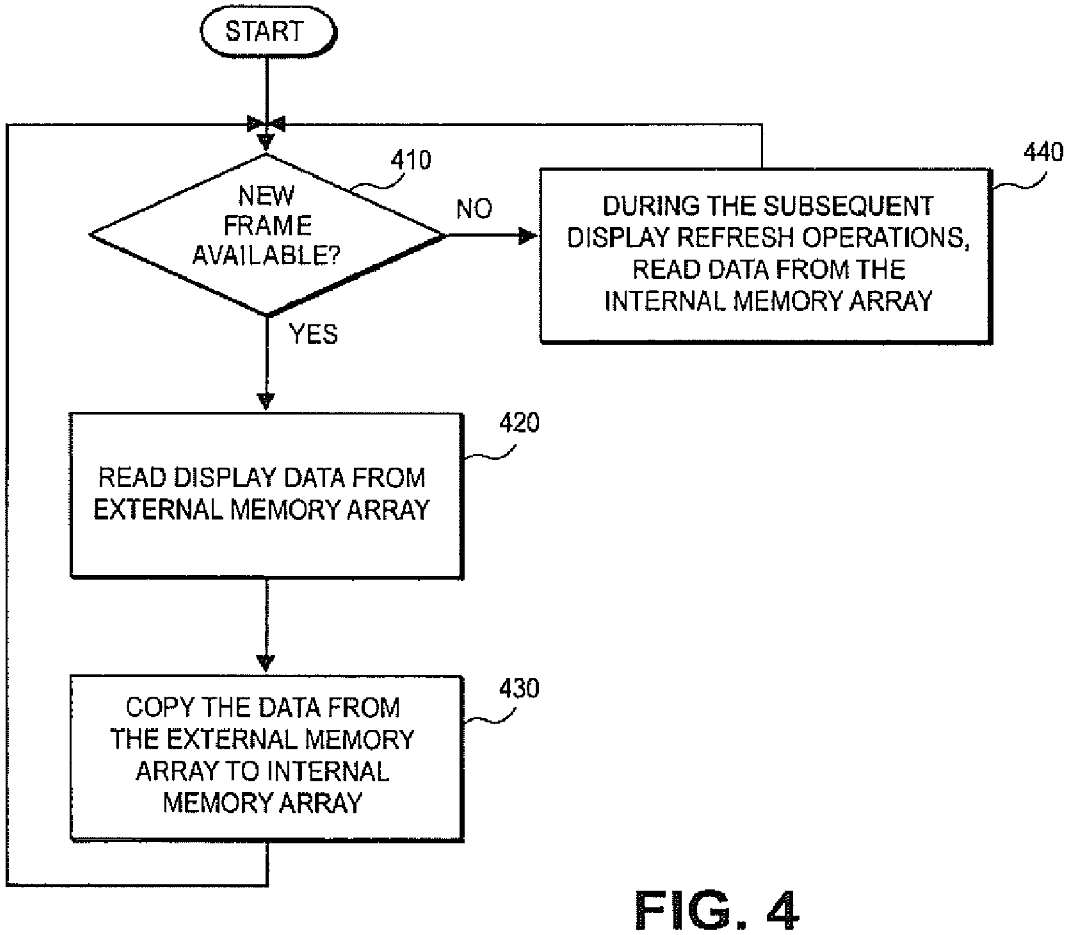
FIG. 4 shows a flowchart of operations performed by a graphics chip according to one embodiment of the invention.

FIG. 4 shows a flowchart diagram of operations performed by a graphics chip according to one embodiment of the invention. In accordance with one embodiment, the display controller selects either the internal frame buffer or the external frame buffer to retrieve display data based on whether the graphics generator has generated new display data. More specifically, the display controller determines if graphics generator has generated new display data in block 410. For example, if there is an indication that most recent display data resides in the external frame buffer, the display controller will execute a new frame display refresh operation by reading the most recent display data from the external frame buffer. Accordingly, if a new frame is available (block 410, yes), i.e., the most recent display data resides in the external frame buffer, the display controller will read display data from the external memory array in block 420. In block 430, the same display data from the external memory array will be copied into the internal memory array, simultaneously with transfer of the data from the external memory array to the display controller. During the subsequent display refresh operations to display the previously displayed frame, the display controller will read the display data from the internal memory array. This display data read by the display controller is the same data that has been previously copied into the internal memory array from the external memory array. When the external frame buffer has not been written with new display data, the display controller will continue to read from the internal memory array, thereby reducing the amount of times the display controller has to access the external frame buffer via an external bus. Accordingly, if a new frame is not available (block 410, no), i.e., the data residing in the external memory array is the same data stored in the internal memory array, the display controller will read display data from the internal memory array in block 440.

In the above description, specific details are set forth. However, it is understood that embodiments of the invention may be practiced without these specific details. In other instances, well-known circuits, structures and techniques have not been shown in detail to avoid obscuring the understanding of this description.

While several embodiments have been described, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method for storing a first frame into a system, wherein the system includes i) a first chip, ii) a display controller, and iii) a copy device, and wherein the first chip includes a first memory, the method comprising:

reading, using the display controller, the first frame from a second memory, wherein the second memory is external to the first chip; and while the first frame is being read from the second memory by the display controller, using the copy device to copy the first frame from the second memory to the first memory, wherein subsequent to the copy device copying the first frame from the second memory to the first memory, the first frame is stored in both the first memory and the second memory.

2. The method of claim 1, wherein the copy device is implemented within a processor.

3. The method of claim 1, wherein the copy device is implemented within a graphics chip.

4. The method of claim 1, wherein:

the second memory is implemented on a second chip, and the system further comprises the second chip; and the first chip further comprises i) the display controller and ii) the copy device.

5. The method of claim 4, wherein the display controller is configured to switch between reading frames from the second memory and reading frames from the first memory in a predetermined pattern.

6. The method of claim 5, wherein:

the predetermined pattern is based on a display refresh rate and an information update rate;

the display refresh rate is associated with reading frames from the second memory and the first memory; and the information update rate is associated with reading frames from the second memory independent of reading frames from the first memory.

7. The method of claim 1, wherein:

the copy device comprises a register; and the method further comprises receiving the first frame from the second memory at a first rate, and transferring the first frame from the register to the first memory at a second rate, wherein the second rate is different than the first rate.

8. The method of claim 1, wherein the display controller, the copy device, and a graphics generator are implemented as a single chip.

9. The method of claim 1, further comprising storing the first frame in both the first memory and the second memory until a second frame is available in the second memory.

* * * * *